United States Patent
Fletcher

(10) Patent No.: US 11,742,761 B2
(45) Date of Patent: *Aug. 29, 2023

(54) VOLTAGE REGULATOR WITH MULTI-LEVEL, MULTI-PHASE BUCK ARCHITECTURE

(71) Applicant: Apple Inc., Cupertino, CA (US)

(72) Inventor: Jay B. Fletcher, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,027

(22) Filed: Aug. 29, 2022

(65) Prior Publication Data
US 2023/0048248 A1 Feb. 16, 2023

Related U.S. Application Data

(63) Continuation of application No. 17/140,919, filed on Jan. 4, 2021, now Pat. No. 11,431,250, which is a continuation of application No. 16/570,805, filed on Sep. 13, 2019, now Pat. No. 10,886,851.

(51) Int. Cl.
*H02M 3/158* (2006.01)

(52) U.S. Cl.
CPC ................ *H02M 3/1584* (2013.01)

(58) Field of Classification Search
None
See application file for complete search history.

(56) References Cited

U.S. PATENT DOCUMENTS

| | | |
|---|---|---|
| 9,219,369 B2 | 12/2015 | Mehta et al. |
| 9,231,478 B2 | 1/2016 | Sasao et al. |
| 9,419,509 B2 | 8/2016 | Jarvinen et al. |
| 9,548,648 B2 | 1/2017 | Amaro et al. |
| 10,270,339 B2 | 4/2019 | Lee et al. |
| 10,615,697 B1 | 4/2020 | Ferrari et al. |
| 2010/0320983 A1 | 12/2010 | Wu |
| 2013/0094157 A1 | 4/2013 | Giuliano |
| 2014/0176097 A1 | 6/2014 | Huang |
| 2015/0028832 A1 | 1/2015 | Tournatory et al. |
| 2018/0054121 A1 | 2/2018 | Chen et al. |
| 2018/0115157 A1 | 4/2018 | Chan et al. |

FOREIGN PATENT DOCUMENTS

| | | |
|---|---|---|
| WO | 2015/108613 | 7/2015 |
| WO | 2016/064527 | 4/2016 |

OTHER PUBLICATIONS

International Search Report and Written Opinion in Appl. No. PCT/US2020/042764 dated Oct. 22, 2020, 13 pages.

*Primary Examiner* — Jeffrey A Gblende
(74) *Attorney, Agent, or Firm* — Kowert, Hood, Munyon, Rankin & Goetzel, P.C.; Erik A. Heter; Dean M. Munyon

(57) ABSTRACT

A voltage regulator having a multi-level, multi-phase architecture is disclosed. The circuit includes a two-level buck converter and an N-level buck converter each coupled to an output node, wherein N is an integer value of three or more. During operation, the two-level buck converter provides one of two possible voltages to a first inductor. The N-level buck converter provides, during operation, one of N voltages to a second inductor. The first and second inductors each convert respectively received voltages to currents, which are provided to a common output node. A control circuit controls the activation of transistors in each of the two-level and N-level buck converters in such a manner as to cause the voltage on the output node to be maintained at a desired level.

20 Claims, 7 Drawing Sheets

VOLTAGE REGULATOR WITH MULTI-LEVEL, MULTI-PHASE BUCK ARCHITECTURE

PRIORITY CLAIM

The present application is a continuation of U.S. application Ser. No. 17/140,919, entitled "Voltage Regulator with Multi-Level, Multi-Phase Buck Architecture," filed Jan. 4, 2021 (now U.S. Pat. No. 11,431,250), which is a continuation of U.S. application Ser. No. 16/570,805, entitled "Voltage Regulator with Multi-Level, Multi-Phase Buck Architecture," filed Sep. 13, 2019 (now U.S. Pat. No. 10,886,851), which is incorporated by reference herein in its entirety.

BACKGROUND

Technical Field

This disclosure is directed to electronic circuits, and more particularly, to voltage regulator circuits.

Description of the Related Art

Voltage regulators are commonly used in a wide variety of circuits in order to provide a desired voltage to particular circuits. To this end, a wide variety of voltage regulator circuits are available to suit various applications. Linear voltage regulators are used in a number of different applications in which the available supply voltages exceed an appropriate value for the circuitry to be powered. Another type of voltage regulator is a switched-mode voltage regulator, more commonly referred to a switching power supply, or alternatively, a DC-DC converter. Switching power supplies can be subdivided into two categories, buck converters and boost converters. A buck converter, from its supply to its load, steps down an input voltage, while stepping up current. A boost converter, from its supply to its load, steps up the input voltage while stepping down the current.

A basic switching power supply includes a switch, an energy storage element (such as an inductor), and a diode. Operation in a basic switching power supply includes an on state (when the switch is closed) and an off state (when the switch is open). During the on state, the energy storage element begins to store energy. For example, when the energy storage element is an inductor, current increases and responsive thereto, the inductor produces an opposing voltage across its terminals. During the off state, the switch is open and the inductor becomes a current source. Over time, the changing voltage of the switching power supply is averaged out to a substantially DC voltage.

SUMMARY

A voltage regulator having a multi-level, multi-phase architecture is disclosed. In one embodiment, a circuit includes a two-level buck converter and an N-level buck converter each coupled to an output node, wherein N is an integer value of three or more. During operation, the two-level buck converter provides one of two possible voltages to a first inductor. The N-level buck converter provides, during operation, one of N voltages to a second inductor. The first and second inductors each convert respectively received voltages to currents, which are provided to a common output node. A control circuit controls the activation of transistors in each of the two-level and N-level buck converters in such a manner as to cause the voltage on the output node to be maintained at a desired level.

In various embodiments, the circuit may include multiple instances of the two-level buck converter, the N-level buck converter, or both. Some embodiments may also include one or more M-level buck converters coupled to the output node, wherein M is an integer value of three or more and different than N.

BRIEF DESCRIPTION OF THE DRAWINGS

The following detailed description makes reference to the accompanying drawings, which are now briefly described.

Figure 1:
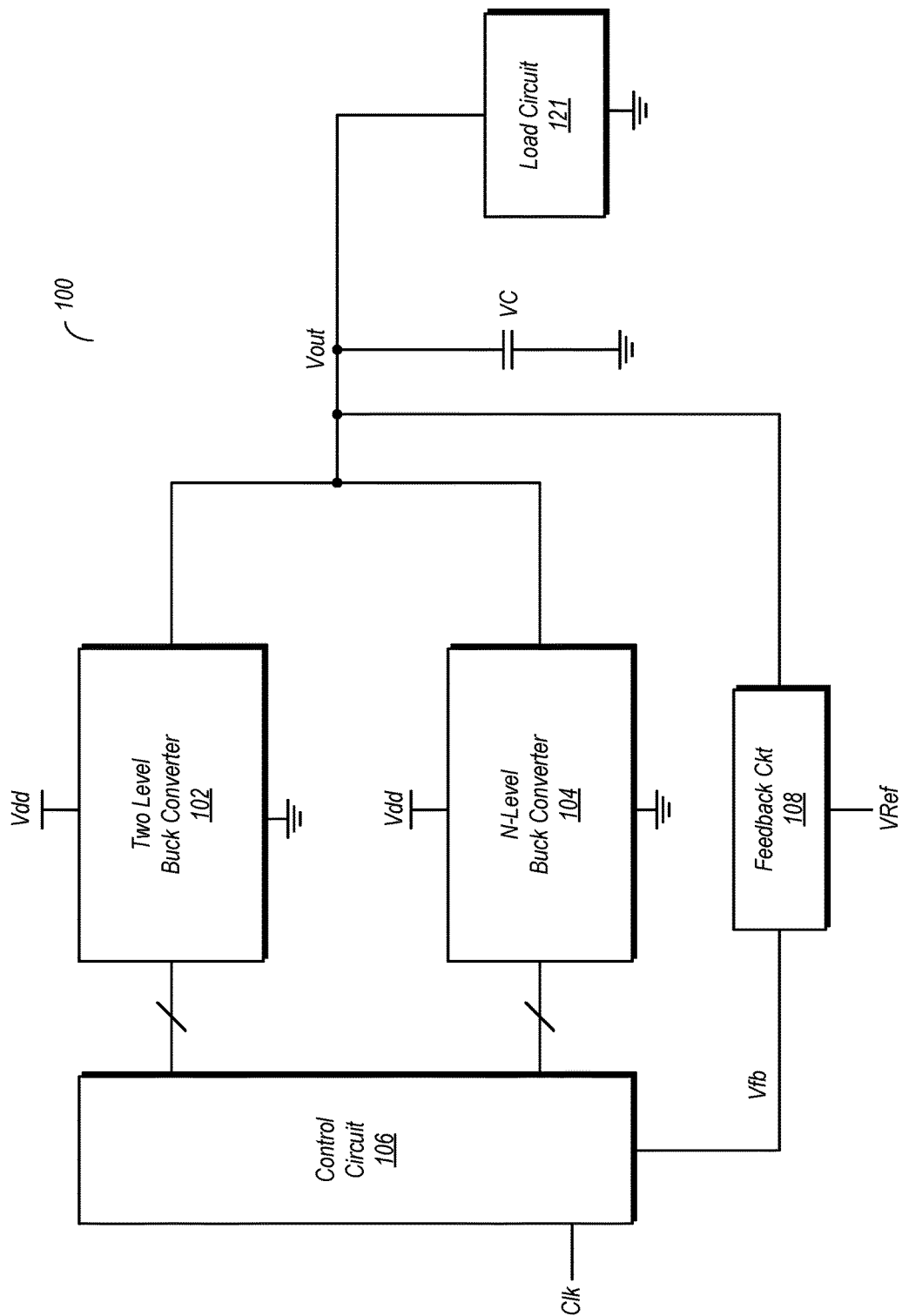
FIG. 1 is a block diagram of one embodiment of a hybrid buck converter having a two-level buck converter and an N-level buck converter.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something; physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to a hybrid buck converter, including multiphase and multi-level elements. Traditional multiphase buck converters are two-level buck converter that drive two different voltage levels in the inductor depending on the state of the switches therein. Multiple instances of a two-level buck converters may be implemented in the same voltage regulator to form a multiphase buck converter. These converters may provide a flat efficiency across the full current range of the converter. Multi-level buck converters that output three or more levels and may be more efficient at low currents. Various embodiment of a hybrid voltage regulator having both two-level and N-level buck converters (where N is an integer value of three or more) are disclosed herein. The present disclosure also contemplates embodiments in which N-level and M-level (where M is an integer value of three or more and not equal to N) combined with a two-level disclosure are also possible and contemplated.

FIG. 1 is a block diagram of one embodiment of a hybrid voltage regulator including a two-level buck converter and an N-level buck converter. In the embodiment shown, voltage regulator 100 includes two-level buck converter 102, an N-level buck converter 104 (where N is an integer value of three or more) each coupled to an output node upon which an output voltage, Vout, is conveyed. Both 2-level buck converter 102 and N-level buck converter 104 are coupled to receive a supply voltage Vdd and are also coupled to a ground node (which may alternatively be referred to as Vss). Voltage regulator 100 also includes a control circuit 106 coupled to control the switching operation in each of the buck converters in the illustrated embodiment. A feedback circuit 108 is coupled between the output voltage node and control circuit 106, and is configured to generate a feedback signal, Vfb. Voltage regulator 100 also includes a capacitor, VC, coupled between the output node and ground. The voltage generated by voltage regulator 100 is provided to a load circuit 121, which may be virtually any type of circuitry which may be powered by a regulated supply voltage.

Two-level buck converter 102 in the embodiment shown is configured to generate one of two different voltages, depending on the states of switches therein, and provide these voltages to an inductor. The inductor integrates the voltages into a current which is conveyed onto the output node. N-level buck converter 104 generates one of N (e.g., three) different voltages and provides these to a corresponding inductor therein. Similar to two-level buck converter 102, an inductor therein converts these voltages to corresponding currents, which are conveyed onto the output node. These currents are summed on the output node, and in turn converted back into a voltage by capacitor VC.

Feedback circuit 108 is configured to convert the output voltage, Vout, into a feedback signal, Vfb. Various circuit topologies may be used to implement feedback circuit 108. One example topology includes a resistive voltage divider and an error amplifier. The error amplifier may receive a voltage from the resistive voltage divider on one input and a reference voltage on another input. The reference voltage may correspond to a desired output voltage, Vout. The error amplifier may output the feedback signal, Vfb, which may be indicative of a difference between the desired and actual output voltages.

Control circuit 106 in the embodiment shown may control the switching of various transistors in two-level buck converter 102 and N-level buck converter 104, based on the received feedback signal. More particularly, the duty cycle of each transistors on/off time may be controlled in such a manner as to adjust the output voltage, Vout, and maintain it at the desired value. The switching of the transistors in each of the buck converters may by synchronized by a clock signal, Clk, which is provided to control circuit 106. Control circuit 106 may be implemented using various types of circuitry, including (but not limited to) sequential logic circuitry, combinational logic circuitry, analog circuitry, and mixed signal circuitry.

Figure 2:
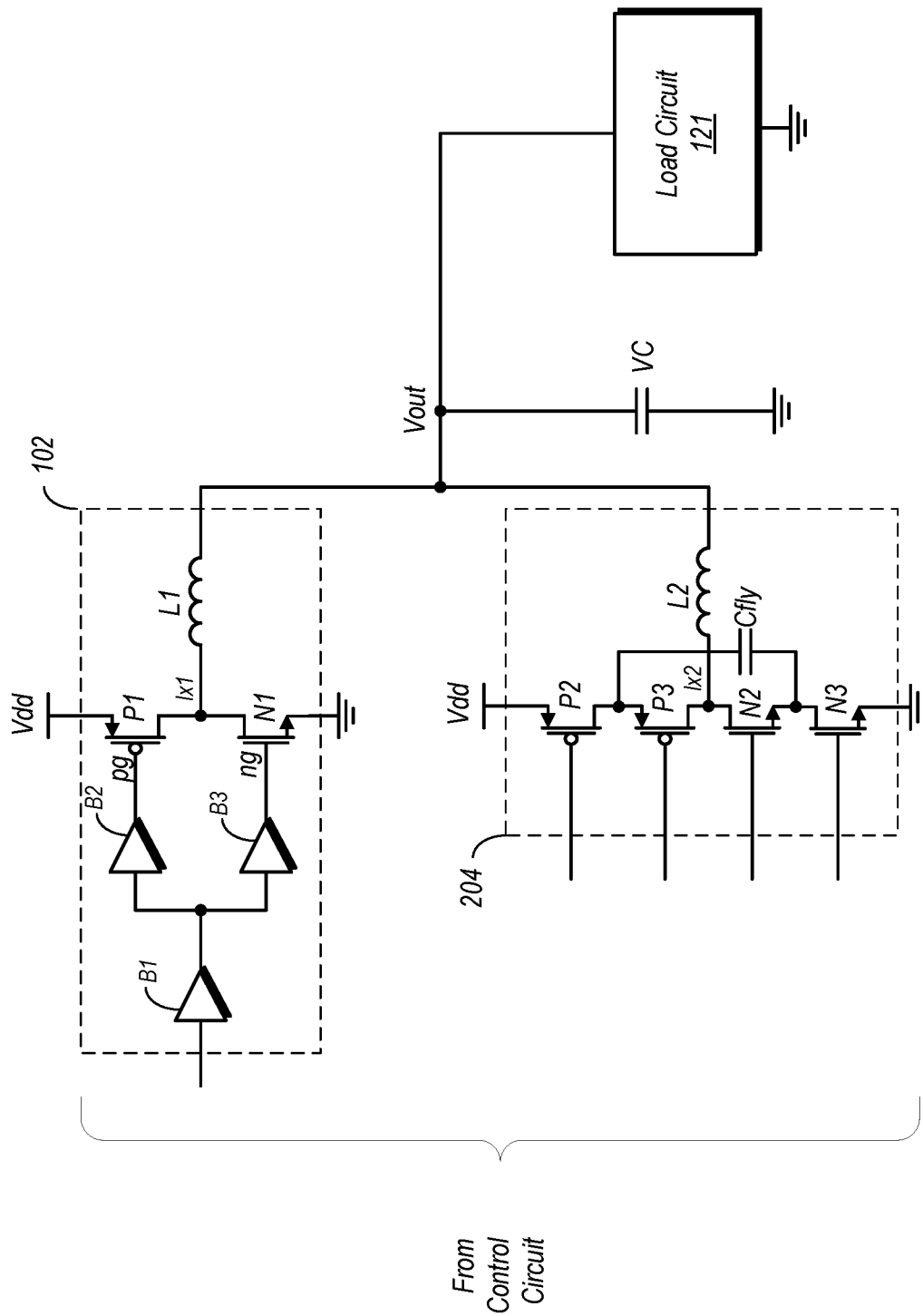
FIG. 2 is a schematic diagram of one embodiment of a hybrid converter having a two-level buck converter and an N-level buck converter.

FIG. 2 is a schematic diagram of one embodiment of a hybrid converter having a two-level buck converter and an N-level buck converter. In the embodiment shown, the N-level buck converter is three-level buck converter 204, although the disclosure is not limited to this number of levels.

Two-level buck converter 102 in the embodiment shown includes a pull-up transistor P1 and a pull-down transistor N1. The pull-up transistor P1 includes a drain terminal coupled to 1×1 and a source terminal coupled to the voltage supply node Vdd. The pull-down transistor N1 includes a drain terminal coupled to node 1×1 and a source terminal coupled to ground (or Vss). The gate terminal of P1, node pg, is coupled to an output of an optional buffer B1, while the gate terminal of N1, ng, is coupled to the output of another optional buffer B3. Both buffer B2 and B3 are coupled to an output of another optional buffer B1, which has an input coupled to other circuitry within control circuit 106. Inductor L1 of two-level buck converter 102 is coupled to node 1×1 at one terminal, and coupled to the output node, Vout, at the other terminal.

Three-level buck converter 204 in the embodiment shown includes a pull-up stack including transistors P2 and P3, and a pull-down stack including transistors N2 and N3. The drain terminal of P3 is coupled to node 1×2, while the source terminal of P3 and the drain terminal of P2 are coupled to one another. The source terminal of P2 is coupled to the supply voltage node Vdd. With respect to the pull-down stack, the drain terminal of N2 is coupled to node 1×2, while the source terminal of N2 is coupled to the drain terminal of N3. The source terminal of N3 is coupled to ground or Vss. Inductor L2 has a first terminal coupled to node 1×2 and a second terminal coupled to the output node, Vout. Three-level buck converter 204 also includes a capacitor, Cfly, which is coupled between the source terminal of P3 and the source terminal of N2.

During operation of two-level buck converter 102, only one of transistors P1 or P2 is active at any given time. When a high is input into buffer B1 (and thus propagates to the gate terminals of P1 and N1), transistor N1 is active while P1 is inactive. When N1 is active, the voltage on node 1×1 is pulled low to ground/Vss. Energy stored in inductor L1 may be discharged through N1 to ground/Vss. Meanwhile, an opposing voltage is developed across inductor L1. When a low is input into buffer B1, transistor P1 is activated while transistor N1 is turned off. When P1 is active, node 1×1 is pulled high toward Vdd. Inductor L1 discharges current to the output node, while an opposing voltage is developed there across.

Control circuit 106 may adjust the current provided by two-level buck converter 102, to the output node, by adjusting its duty cycle, e.g. by changing the amount of time within a given cycle that each transistor is active. This can cause a corresponding adjustment to the voltage on output node Vout.

Three-level buck converter 204 in the embodiment shown may output one of three different voltages—zero volts, Vdd, and a third voltage based on the voltage across the capacitor, Cfly. The voltage on node 1×2 may be pulled low toward ground/Vss when both transistors of the pull-down stack, N2 and N3, are active. The voltage on node 1×2 may be pulled toward Vdd when both transistors of the pull-up stack, P2 and P3, are active. When the transistors of three-level buck converter are switched at a 50% duty cycle, the third voltage on 1×2, which is the voltage across Cfly, is Vdd/2. As will be discussed in further detail below, this third voltage may be adjusted by varying the duty cycle of the transistors in three-level buck converter 204. As with the embodiment discussed above, the current into 1×2 may vary with the voltage on the node at any given time. Similarly, inductor L2 may discharge current in one direction or another depending on the switching states of the transistors, with an opposing voltage developed there across.

The currents generated by two-level buck converter 102 and three-level buck converter 204 are summed on the output node, Vout. Due to the presences of capacitor VC, the currents, and thus the voltage on this node may be averaged out to a DC voltage that is provided to load circuit 121.

Figure 3:
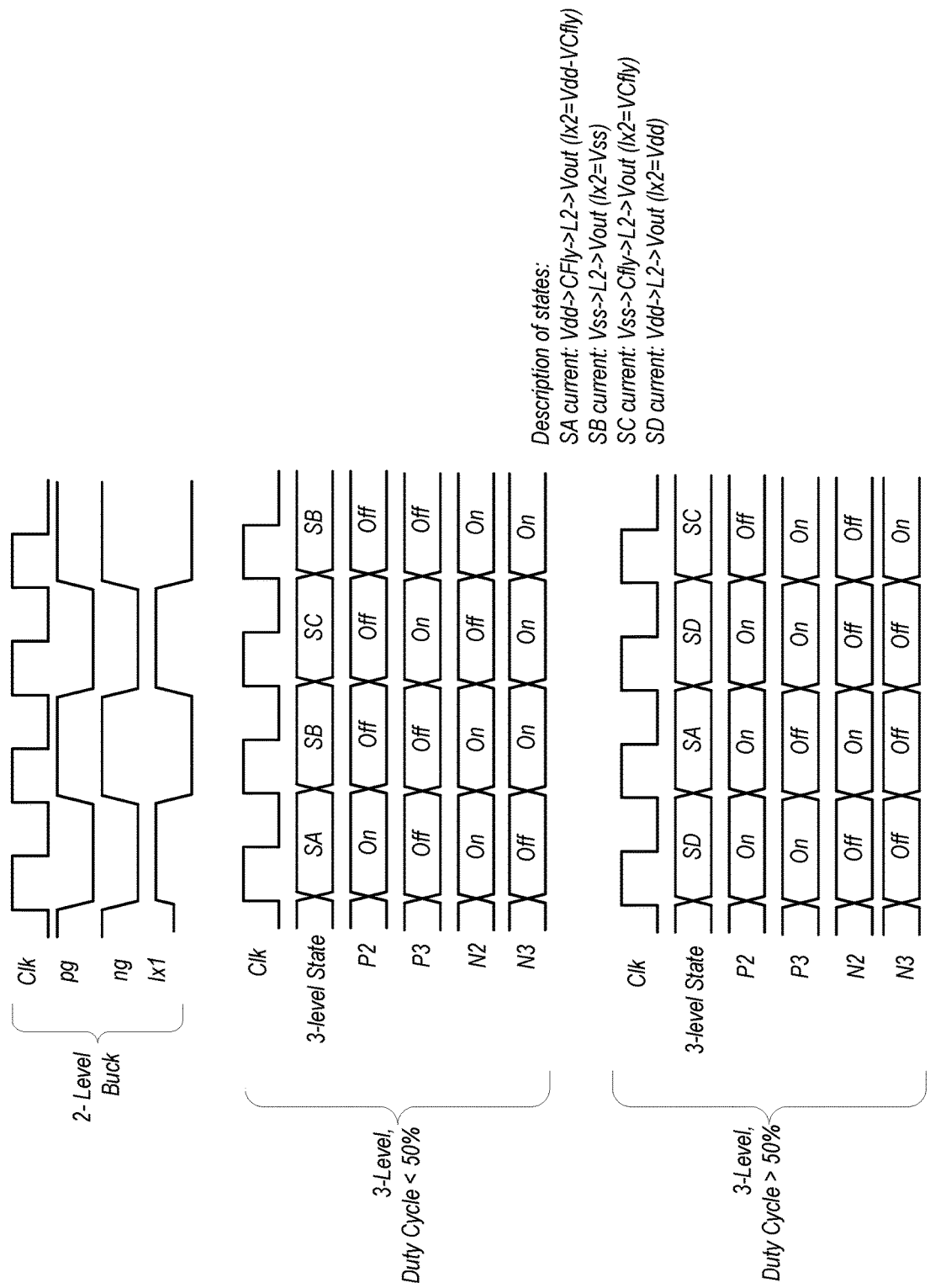
FIG. 3 illustrates the timing of operation for various embodiments of a buck converter.

The timing of operation of embodiments of the buck converters discussed above are shown in FIG. 3. In the uppermost timing diagram, the timing of an embodiment of a two-level buck converter operating at a 50% duty cycle is shown. The bottom two timing diagrams illustrate the operation of an embodiment of a three level buck converter with duty cycles of less than 50% and greater than 50% are shown.

In the two-level buck example at the top of the diagram, nodes pg and ng correspond to the gate terminals of transistor P1 and N1, respectively, of the embodiment of two-level buck converter 102 shown in FIG. 2. The voltage on node 1×1 resulting from these switching states is also illustrated. When pg and ng are both low, transistor P1 is active and N1 is inactive. The voltage on 1×1 is thus pulled up toward Vdd. When pg and ng are both high, transistor P1 is turned off while transistor N1 is turned on. The voltage on 1×1 is thus pulled down toward ground/Vss.

With respect to the illustrations directed to the three-level buck converter, it is noted that the widths of the pulses depicted are not necessarily to scale. Nevertheless, the states shown are those through which the circuit progresses for their respectively labeled duty cycle.

The three-level states corresponding to the output of three-level buck converter 204 are as follows. A first state, SA, corresponds to node 1×2 being equal to Vdd-VCfly (VCfly being the voltage across capacitor Cfly) with the flow of current being from Vdd, through Cfly and L2 to the output node Vout. The SB state correspond to 1×2 being equal to Vss, with the current path from Vss, through L2, to Vout. The SC state corresponds to the voltage across 1×2 being equal to the voltage across Cfly, with the current path being from Vss, through Cfly and L2 to Vout. The SD state corresponds to the voltage on 1×2 being equal to Vdd, with the current path existing from Vdd, through L2, to Vout. The states may also be described in terms of particular transistor configurations (on/off). For example, the SB state corresponds to transistors N2 and N3 being turned on, with P2 and P3 turned off (and thus, the pull-down path is fully activated). Similarly, the SD state corresponds to transistors N2 and N3 being turned off while P2 and P3 are both turned on (and thus, the pull-up path being fully activated). These transistor configurations are described in the timing diagrams in conjunction with their respective states.

In the timing diagram corresponding to a duty cycle of less than 50%, the voltages on node 1×2 varies between a low of Vss and Vdd-VCfly, with VCfly being the third voltage level, which is less than Vdd/2 in this case. The SA state occurs when both transistors P2 and N2 are on, while P3 and N3 are off. The next state, SB, occurs with both P2 and P3 turned off, while N2 and N3 are both turned on. The SC state follows, and occurs when P2 and N2 are turned off, while P3 and N3 are turned on. The final state in the cycle is SB. Thereafter, the cycle may repeat as operation continues.

In the timing diagram corresponding to a duty cycle greater than 50%, the cycle is as follows. The first state produced in the cycle is the SD cycle, which occurs with P2 and P3 on, while N2 and N3 are off. The next state is the SA state, with P2 and N2 on, while P3 and N3 are off. The SD state follows the SA state. The final state in this sequence is the SC state, which occurs with transistors P2 and N2 being turned off, while P3 and N3 are turned on.

Figure 4:
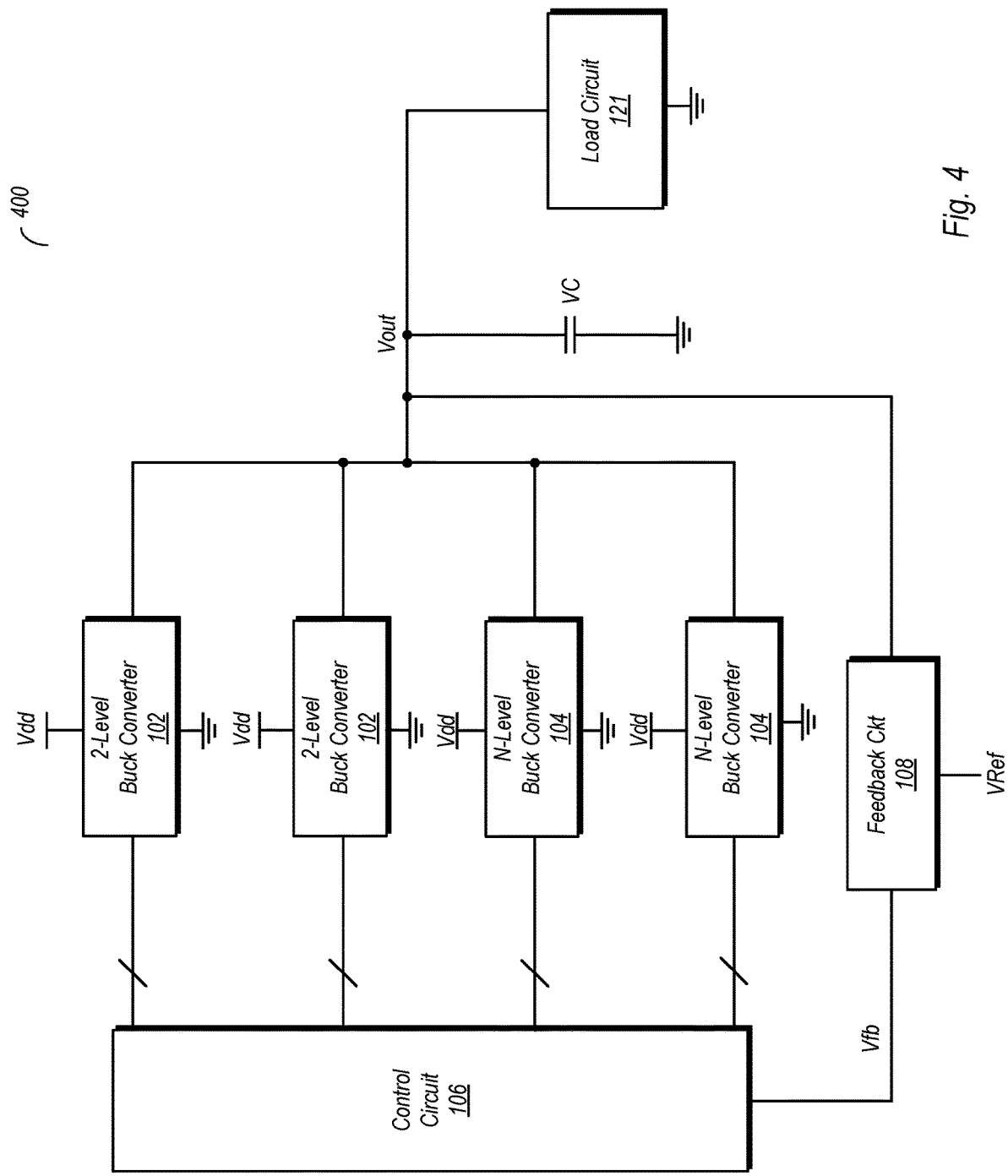
FIG. 4 is a block diagram of another embodiment of a hybrid buck converter.

FIG. 4 is a block diagram of another embodiment of a voltage regulator having multiple instances of both a two-level and N-level buck converters. In the embodiment shown, voltage regulator 400 includes two instances of a two-level buck converter 102 and two instances of an N-level buck converter 104. Generally speaking, a voltage regulator in accordance with the present disclosure may be implemented with any number of 2-level buck converters 102 and any number of N-level buck converters. Furthermore, the control circuit 106 in such embodiments may independently control the switching sequences for each of the buck converters may be switched independent of one another. Thus, the two-level buck converters may be switches using different duty cycles from one another. Similarly, the two N-level buck converters 104 may be switched with different duty cycles with respect to each other. Any number of two-level buck converters 102 and any number of N-level buck converters may be implemented in various embodiments, according to the specifications of the particular implementation in which voltage regulator 400 is used.

Figure 5:
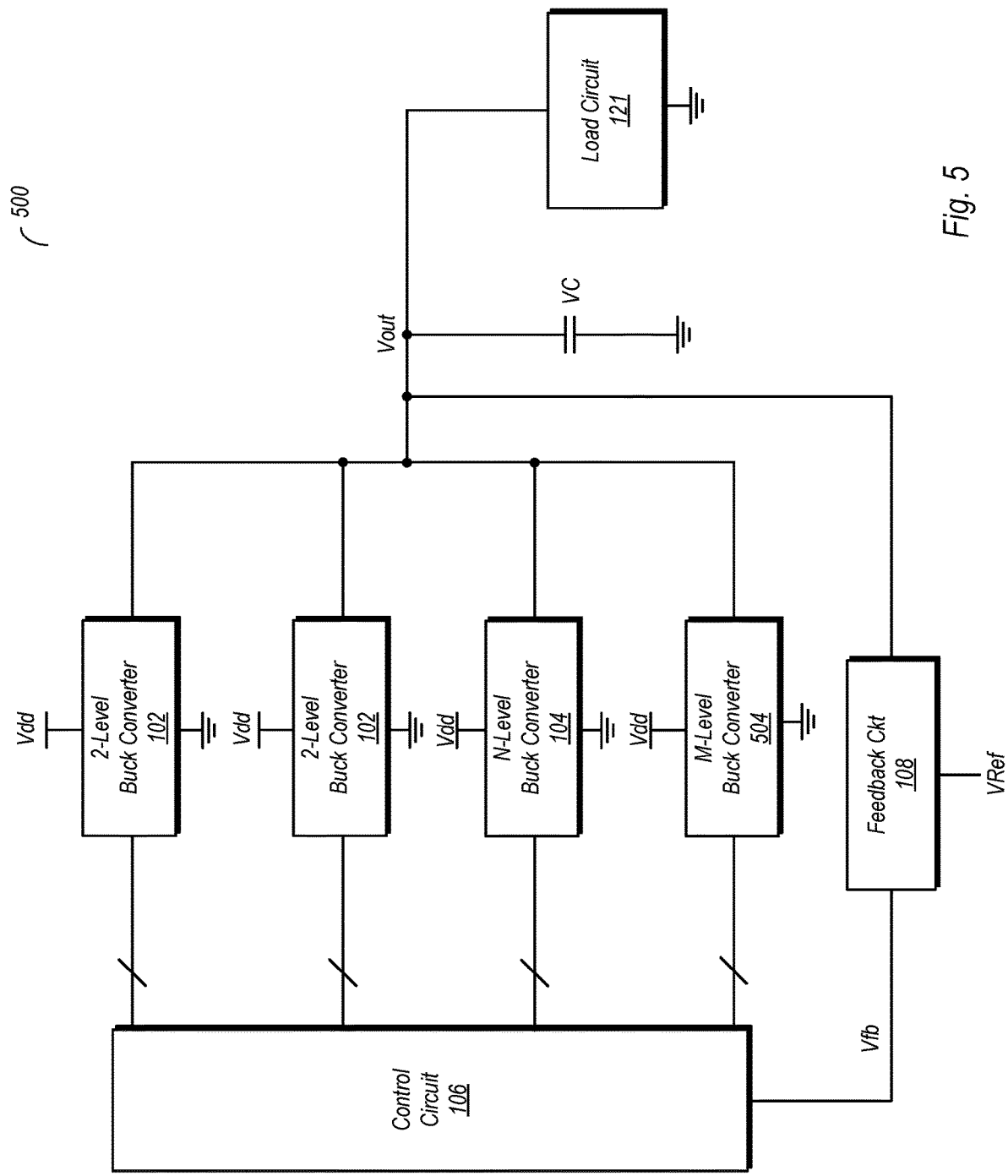
FIG. 5 is a block diagram of another embodiment of a hybrid buck converter.

FIG. 5 is another embodiment of a voltage regulator. In this particular embodiment, in addition to multiple two-level buck converters 102, an N-level buck converter 104 and an M-level buck converter 504 are also included. In this example, M is also an integer number of three or more, and is also different from N. For example, N could equal three while M could equal five, and thus a corresponding embodiment would include both a three-level and a five-level buck converter as well as the two-level buck converters 102 shown here. Furthermore, embodiments that includes multiple instances of the N-level buck converter 104, M-level buck converter 504, or both (in addition to the two-level buck converters 102) are also possible and contemplated.

Figure 6:
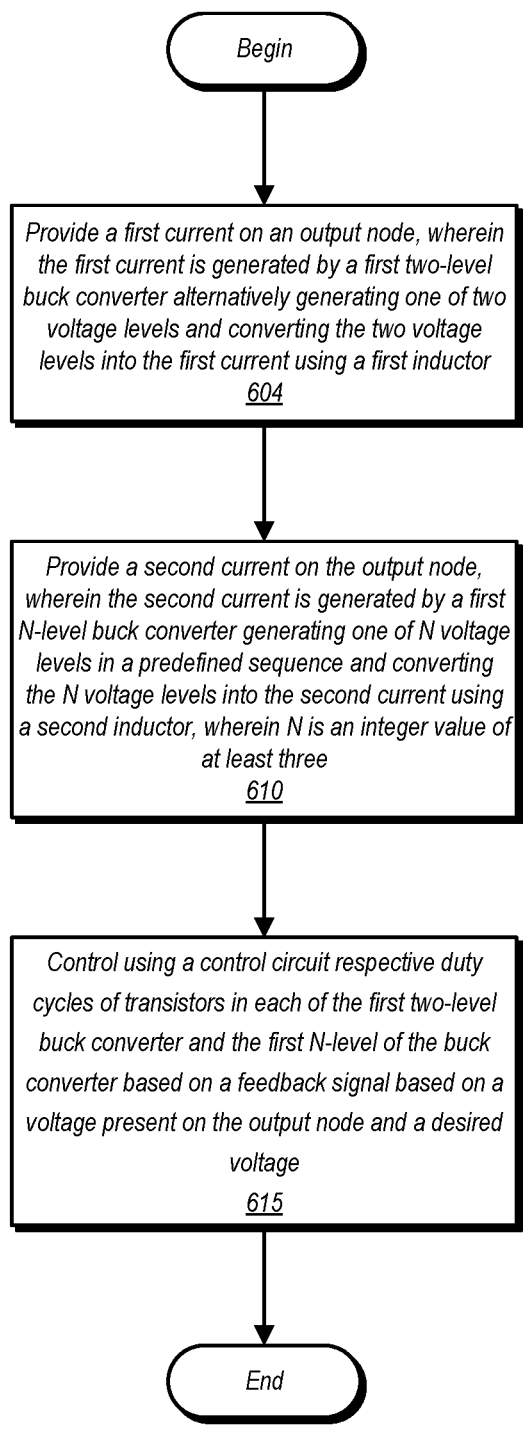
FIG. 6 is a flow diagram illustrating operation of one embodiment of a hybrid buck converter.

FIG. 6 is a flow diagram illustrating operation of one embodiment of a hybrid buck converter. Method 600 may be performed using various embodiments of a voltage regulator as discussed above and illustrated in FIGS. 1-5. Embodiments of a voltage regulator not explicitly discussed in this disclosure may fall within the scope of this disclosure.

Method 600 includes providing a first current on an output node, wherein the first current is generated by a first two-level buck converter alternatively generating one of two voltage levels and converting the two voltage levels into the first current using a first inductor (block 605). The method further includes providing a second current on the output node, wherein the second current is generated by a first N-level buck converter generating one of N voltage levels in a predefined sequence and converting the N voltage levels into the second current using a second inductor, wherein N is an integer value of at least three (block 610). During performance of the method, a control circuit controls respective duty cycles of transistors in each of the first two-level buck converter and the first N-level of the buck converter based on a feedback signal based on a voltage present on the output node and a desired voltage (block 615).

In various embodiments, the method includes the control circuit varying a duty cycle of activation of various transistors in the first two-level buck converter and the first N-level buck controller. In some embodiments a plurality of two-level buck converters provide respective currents on the output node, the plurality of two-level buck including the first two-level buck converter. Embodiments are also possible and contemplated in which a plurality of N-level buck converters provide respective currents on the output node, the plurality of N-level buck converters including the first N-level buck converter, as well as those having at least one M-level buck converter providing a respective current on the output node, wherein M is an integer value of three or more, and where M is not equal to N.

Figure 7:
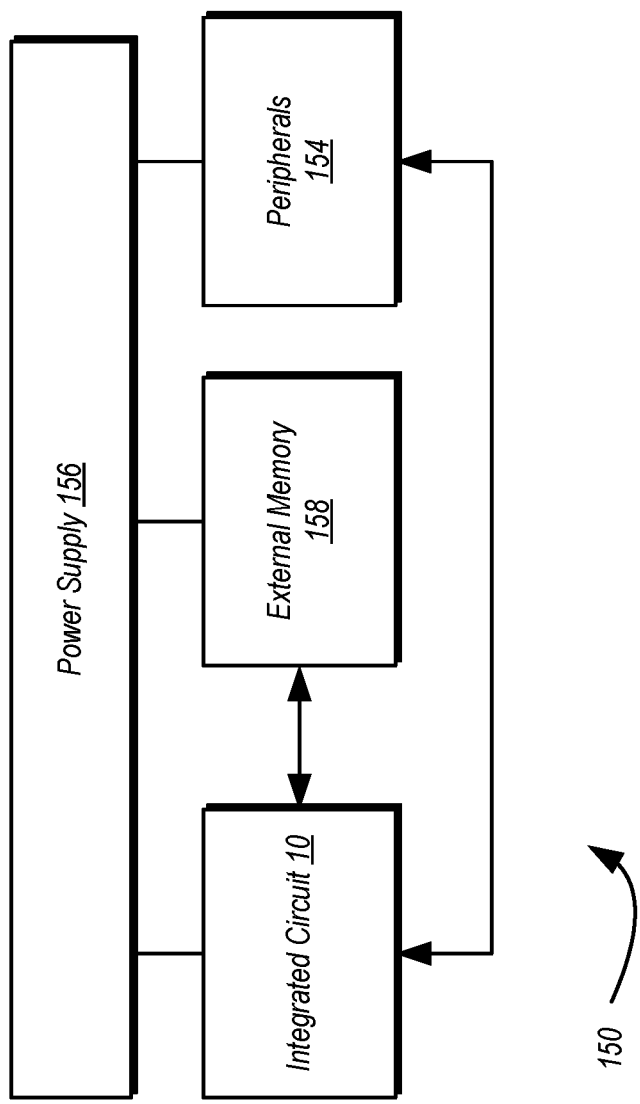
FIG. 7 is a block diagram of one embodiment of an example system.

Turning next to FIG. 7, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

In various embodiments, integrated circuit 10 and/or peripherals 154 may include implementations of the hybrid DC-DC converters discussed above in FIGS. 1-5.

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A circuit comprising:
   a first two-level power converter including a first inductor coupled between a first switching node and an output node, wherein the first two-level power converter is configured to provide, via the first inductor, a first current on the output node;

a first N-level power converter including a second inductor coupled between a second switching node and the output node, wherein the first N-level power converter is configured to provide, via the second inductor, a second current on the output node;
at least one M-level power converter including a third inductor coupled between a third switching node and the output node, wherein the at least one M-level power converter is configured to provide, via the third inductor, a third current on the output node, wherein M and N are integer values different from one another; and
a control circuit configured to, based on a feedback voltage, control respective states of switches in the first two-level power converter, the first N-level power converter, and the at least one M-level power converter to generate a regulated supply voltage on the output node.

2. The circuit of claim 1, wherein the control circuit is configured to cause switches of the first two-level power converter to operate with a duty cycle of 50%, and further configured to cause switches of the first N-level power converter to operate with a duty cycle that is not equal to 50%.

3. The circuit of claim 1, wherein the control circuit is configured to control respective switches for the first two-level power converter, the first N-level power converter, and the at least one M-level power converter independently of one another.

4. The circuit of claim 1, further comprising a feedback circuit coupled between the output node configured to generate the feedback voltage based on a value of the regulated supply voltage and a reference voltage.

5. The circuit of claim 4, wherein the control circuit is configured to control switching sequences of the first two-level power converter, the first N-level power converter, and the at least one M-level power converter based on the feedback voltage.

6. The circuit of claim 1, further comprising a second N-level power converter, wherein the control circuit is configured to control respective switching sequences for the first and second N-level power converters such that their respective duty cycles are different from one another.

7. The circuit of claim 1, further comprising a second two-level power converter, wherein the control circuit is configured to control respective switching sequences for the first and second two-level power converters based on the feedback voltage.

8. The circuit of claim 1, wherein the first N-level power converter is a three-level power converter having a pull-up circuit coupled between the second switch node and an input voltage node, and a pull-down circuit coupled between the second switch node and a ground node, wherein the pull-up circuit includes first and second switches, and wherein the pull-down circuit includes third and fourth switches.

9. The circuit of claim 8, wherein the first N-level power converter includes a capacitor having a first node coupled to a junction between the first and second switches, and a second node coupled between the third and fourth switches, wherein, at a given point in a switching sequence, the first N-level power converter is configured to generate the second current based on an input voltage, a ground voltage, or a voltage across the capacitor.

10. The circuit of claim 8, further comprising a summing capacitor coupled between the output node and a ground node, wherein the summing capacitor is configured to convert a sum of the first, second, and third currents on the output node into the regulated supply voltage.

11. A method comprising:
generating, by a first two-level power converter and via a first inductor, a first current on an output node;
generating, by a first N-level power converter and via a second inductor, a second current on the output node;
generating, by an M-level power converter and via a third inductor, a third current on the output node, wherein M and N are integer values different from one another; and
controlling, using a control circuit and based on a feedback voltage, respective states of switches in the first two-level power converter, the first N-level power converter, and the M-level power converter to generate a regulated supply voltage on the output node.

12. The method of claim 11, further comprising:
causing switches of the first two-level power converter, using the control circuit, to operate with a duty cycle of 50%; and
causing switches of the first N-level power converter, using the control circuit, to operate with a duty cycle that is not equal to 50%.

13. The method of claim 11, further comprising controlling, using the control circuit, respective switches of the first two-level power converter, the first N-level power converter, and the M-level power converter independently of one another.

14. The method of claim 11, further comprising generating, using a feedback circuit, the feedback voltage based on a value of the regulated supply voltage and a reference voltage.

15. The method of claim 14, further comprising:
controlling, using the control circuit and based on the feedback voltage, respective switching sequences of the first two-level power converter, the first N-level power converter, and the M-level power converter; and
generating the regulated supply voltage based on the controlling.

16. The method of claim 11, wherein the first N-level power converter is a three-level power converter.

17. A system comprising:
a load circuit;
a multi-phase power converter configured to generate and provide a regulated supply voltage, via an output node, to the load circuit, wherein the multi-phase power converter includes:
a two-level power converter configured to generate, via a first inductor, a first current on the output node;
an N-level power converter configured to generate, via a second inductor, a second current on the output node;
an M-level power converter configured to generate, via a third inductor, a third current on the output node, wherein N and M are integer value that are different from one another; and
a control circuit configured to control, based on a feedback voltage, respective states of switches in the two-level power converter, the N-level power converter, and the M-level power converter to generate the regulated supply voltage on the output node.

18. The system of claim 17, wherein the multi-phase power converter further comprises a feedback circuit configured to generate the feedback voltage based on the regulated supply voltage and a reference voltage.

19. The system of claim 17, wherein the control circuit is configured to:
control switching sequences of the two-level power converter, the N-level power converter, and the M-level power converter independently of one another;

cause switches of the two-level power converter to operate at a duty cycle of 50%, and cause switches of the N-level power converter to operate at a duty cycle not equal to 50%.

20. The system of claim 17, wherein the multi-phase power converter further comprises a summing capacitor coupled between the output node and a ground node, wherein the summing capacitor is configured to convert a of sum the first, second, and third currents on the output node into the regulated supply voltage.

* * * * *